(12) United States Patent
Moroney

(10) Patent No.: US 9,313,041 B2
(45) Date of Patent: Apr. 12, 2016

(54) NETWORK ATTACHED DVR STORAGE

(75) Inventor: Paul Moroney, La Jolla, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 359 days.

(21) Appl. No.: 12/874,825

(22) Filed: Sep. 2, 2010

(65) Prior Publication Data
US 2011/0213856 A1 Sep. 1, 2011

Related U.S. Application Data

(60) Provisional application No. 61/239,148, filed on Sep. 2, 2009.

(51) Int. Cl.
| | |
|---|---|
| G06F 15/16 | (2006.01) |
| H04L 12/28 | (2006.01) |
| G06F 21/10 | (2013.01) |
| H04L 29/06 | (2006.01) |
| H04N 5/765 | (2006.01) |
| H04N 21/436 | (2011.01) |
| H04N 21/4408 | (2011.01) |
| H04N 21/4627 | (2011.01) |

(52) U.S. Cl.
CPC ............ *H04L 12/2812* (2013.01); *G06F 21/10* (2013.01); *H04L 63/10* (2013.01); *H04N 5/765* (2013.01); *H04N 21/43615* (2013.01); *H04N 21/43622* (2013.01); *H04N 21/4408* (2013.01); *H04N 21/4627* (2013.01); *H04L 2012/2849* (2013.01); *H04L 2463/101* (2013.01)

(58) Field of Classification Search
CPC ..... G06F 21/10; H04L 12/2812; H04L 63/10; H04L 5/765; H04L 21/43615; H04L 21/43622; H04L 21/4408; H04L 21/4627; H04L 2012/2849; H04L 2463/101
USPC ......................................... 709/217, 218, 219
See application file for complete search history.

(56) References Cited

U.S. PATENT DOCUMENTS

| | | | |
|---|---|---|---|
| 5,414,455 A | 5/1995 | Hooper et al. | |
| 5,912,700 A | 6/1999 | Honey et al. | |
| 6,492,997 B1 | 12/2002 | Gerba et al. | |
| 6,961,430 B1 | 11/2005 | Gaske et al. | |
| 8,000,474 B1 * | 8/2011 | Evans et al. ................... | 380/205 |
| 2002/0140861 A1 | 10/2002 | Janevski et al. | |
| 2002/0140862 A1 | 10/2002 | Dimitrova et al. | |

(Continued)

FOREIGN PATENT DOCUMENTS

EP 1185095 A1 3/2002

OTHER PUBLICATIONS

PCT Search Report & Written Opinion, RE: Application #PCT/US2010/47696; Oct. 14, 2010.

*Primary Examiner* — Cheikh Ndiaye
(74) *Attorney, Agent, or Firm* — Fish & Richardson P.C.

(57) ABSTRACT

A host device, which may include a DVR, selects to record content on the host device DVR or in a network attached storage (NAS) unit. The recorded content remains bound to the host device from a DRM perspective when it is recorded on the host DVR and on the remotely located NAS. A client device can obtain access to content recorded on the NAS by negotiating DRM rights with the host device instead of the NAS. When access rights are approved, the host device provides access information to the client device so that the content is streamed directly to the client device from the NAS.

20 Claims, 4 Drawing Sheets

(56) References Cited

U.S. PATENT DOCUMENTS

| | | |
|---|---|---|
| 2002/0199185 A1 | 12/2002 | Kaminski et al. |
| 2003/0001908 A1 | 1/2003 | Cohen-solal |
| 2003/0067554 A1 | 4/2003 | Klarfeld et al. |
| 2003/0079016 A1* | 4/2003 | Tsao ............................. 709/226 |
| 2003/0159145 A1 | 8/2003 | Kaltz |
| 2003/0163816 A1 | 8/2003 | Gutta et al. |
| 2004/0117619 A1* | 6/2004 | Singer et al. .................. 713/156 |
| 2004/0148344 A1* | 7/2004 | Navar et al. ................... 709/203 |
| 2005/0210500 A1* | 9/2005 | Stone ............................. 725/31 |
| 2006/0069645 A1* | 3/2006 | Chen et al. ...................... 705/51 |
| 2006/0107293 A1 | 5/2006 | Ma |
| 2006/0117379 A1* | 6/2006 | Bennett ................. H04L 67/327 726/3 |
| 2006/0171658 A1 | 8/2006 | Jochemsen et al. |
| 2006/0218620 A1* | 9/2006 | Nadarajah et al. ............ 725/151 |
| 2006/0271994 A1 | 11/2006 | Tada |
| 2007/0058924 A1* | 3/2007 | Yeh ................................. 386/46 |
| 2007/0098357 A1 | 5/2007 | McEnroe et al. |
| 2007/0122108 A1 | 5/2007 | Bontempi |
| 2007/0174471 A1 | 7/2007 | Van Rossum et al. |
| 2008/0189749 A1 | 8/2008 | White et al. |
| 2008/0282302 A1 | 11/2008 | Steelberg et al. |
| 2009/0034935 A1 | 2/2009 | Putterman et al. |
| 2009/0100478 A1 | 4/2009 | Craner et al. |
| 2010/0169906 A1 | 7/2010 | Takahashi |

\* cited by examiner

NETWORK ATTACHED DVR STORAGE

This application claims the benefit of U.S. Provisional Application No. 61/239,148 filed on Sep. 2, 2009, titled Network Attached DVR Storage, herein incorporated by reference in its entirety.

BACKGROUND

Many consumers record large volumes of audio video (A/V) content, such as television shows on home digital video recording devices (DVRs). DVRs may be included in a set top box (STB) or a stand alone device which is connected to a television signal source, such as an antenna or STB.

A STB often receives encrypted content from a content provider. The STB decrypts and decodes the content to be provided to a display device, e.g. television. If the user selects to record the content, such as by individual content selection, a scheduled recording or a program series recording, and the STB includes a DVR function, the content may be recorded on the internal disk of the STB or on an external disk attached to that DVR. The content is typically recorded on the DVR in an encrypted form and with established digital rights management (DRM) protocols to ensure that the content is only accessed by the user/STB which requested the recording.

Many consumers use multiple STBs in a local area network (LAN) connected to multiple televisions within their house. One STB (a client) may be able to access content stored on another (host) STB/DVR using various digital rights management (DRM) protocols. For example an IPRM (IP rights management) protocol may be used. Another exemplary protocol may be DTCP IP protocol associated with OCAP. Another exemplary approach used is a Home Media Architecture (HMA) which is a proprietary transport approach of Motorola, Inc. A key requirement of most DVR storage approaches, that content be playable only by the DVR that recorded it. The typical DRM approach requires the requesting client device to negotiate access with the host device prior to transferring content recorded on the host to the client. Such negotiation typically requires authentication of the client and a key exchange which enables the client to decrypt the encrypted content. The content typically remains encrypted during transport from the host to the client.

However, despite having more than one digital video recorder (DVR), many consumers still do not have enough storage space for their needs. There is a need to provide additional storage for consumers which is easy to use for consumers, maintains DRM protections of content, and which minimizes bandwidth usage.

SUMMARY OF THE INVENTION

In accordance with the principles of the invention, an apparatus for recording user selected content may comprise: a receiver which receives content from a network; a processing unit which identifies content to be recorded based on instructions from a user, determines digital rights management (DRM) rights to record content and access recorded content, and selects a recording location for recording the content, wherein the processing unit selects to record the content on a local digital video recorder (DVR) or a remotely located network attached server (NAS), and wherein the processing unit provides DRM negotiation for accessing content recorded on both the local DRV and the NAS.

In the apparatus, the processing unit may be configured to provide access to content stored on the local DVR to the one or more client devices. The processing unit may negotiates access based on DRM rights with a requesting client of the one or more client devices, and provides access to content stored on the NAS to the requesting client based on the negotiation.

The apparatus may include a network interface which provides communications from a distributed content provider network, and communications with the NAS. The network interface provides communications from one or more client devices and the apparatus is configured to provide access to content stored on the local DVR to the one or more client devices. The client device may be any device on the LAN which is requesting access to the content. The apparatus may be configured to provide access to content stored on the NAS to the one or more client devices. The processing unit may negotiate DRM rights with a requesting client of the one or more client devices, and provide access to content stored on the NAS to the requesting client based on the negotiation, whereby the requesting client does not negotiate DRM rights with the NAS to obtain access to content stored on the NAS.

In accordance with the principles of the invention, a method of playing back recorded content may comprise the steps of: receiving a request at a DVR capable host device from a client device to access recorded content, the host device and the client device being contained in a local area network (LAN); determining a recording location of the recorded content to be at a network attached storage unit (NAS) within the LAN; performing a DRM dialog between the client device and the host device to obtain access to the recorded content; and providing instructions to the client device to enable the content to be provided to the client device from the NAS without performing a DRM dialog between the client device and the NAS.

In the method the recorded content on the NAS will be bound to the host DVR device from which it was recorded, located in the LAN. The content may be recorded on the NAS in an encrypted form using a key unique to the content. The host device includes a digital video recording unit (DVR), and the host device negotiates with the client for DRM access rights when the client requests access to content stored on the DVR locally or stored (from the DVR) on to the NAS.

In accordance with the principles of the invention, a non-transitory computer readable medium may carry instructions for a processor to perform a method of playing back recorded content comprising the steps of: receiving a request at a DVR capable host device from a client device to access recorded content, the host device and the client device being contained in a local area network (LAN); determining a recording location of the recorded content to be at a network attached storage unit (NAS) within the LAN; performing a DRM dialog between the client device and the host device to obtain access to the recorded content; and providing instructions to the client device to enable the content to be provided to the client device from the NAS without performing a DRM dialog between the client device and the NAS.

A DVR host device, which may include a local disk, selects to record content on the host device disk or forward it to a network attached storage (NAS) unit. The recorded content remains bound to the host device from a DRM perspective when it is recorded on the host disk or on the remotely located NAS. A client device can obtain access to content recorded on the NAS by negotiating DRM rights with the host device instead of the NAS. When access rights are approved, the host device provides access information to the client device so that the content is streamed directly to the client device from the NAS.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

In accordance with the invention a NAS solution (Network Attached Storage) may be installed in customer homes to increase their available storage space. The use of a home based NAS also places the storage and security of the storage under the control of the user. Ideally, the NAS may provide a large consumer purchased storage that could hold extra PC files as well as extra DVR video files, subject to DRM rules associated with such.

One approach may be to modify each DVR so that content could be moved (file transfer) to external storage over the IP home network, then certainly those files could be brought back to be played. If however, the requesting client was in another room, the network bandwidth would be used twice to facilitate the move, once to bring the file back to the DVR, and once to stream it over to the client. Any of the other devices on the home local area network (LAN) may be a client device at any time, and a host device at another time. For example, IP STB 6 may be the client device which is requesting content stored on NAS 10 while STB 2 may be a host device.

Another approach may be to build a digital rights management (DRM)-enabled NAS, or in this case, an HMA-enabled NAS. For example the content may need to be input to the NAS and identify that device essentially as a form of DVR. That device would need to be modified to support enough hardware security to be robust. Home network bandwidth would be used efficiently, as there would be a single stream from the NAS to the client, but the amount of development could be large.

Figure 1:
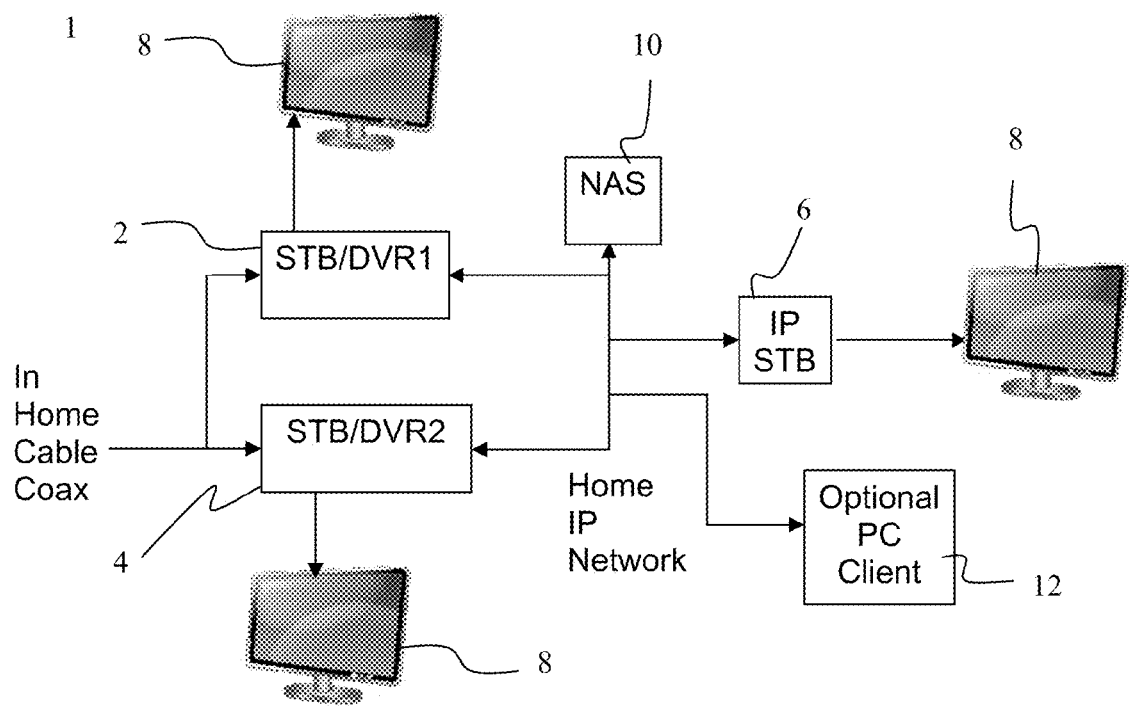
FIG. 1 illustrates an exemplary system architecture in accordance with the principles of the invention.

FIG. 1 illustrates an implementation in accordance with the principles of the invention. As shown in FIG. 1, a network attached storage unit (NAS) 10 may be coupled with a home media network (HMN) (1) contained in the home of a user. The home media network may include multiple set top boxes (STB) 2, 4, an Internet Protocol STB (IP STB) 6, and a PC client 12. Each STB, IP STB and PC client may contain DVR capability. Several display devices 8, such as televisions, may be connected to the STB, IP STB and PC in the home media network. The HMN 1 may be connected to a distributed content provider network system, such as a hybrid fiber coaxial HFC network, IPTV network, switched digital video network, a satellite service provider, etc., through a communications network (not shown). The communications network may include, for instance, a broadband connection to the content provider, such as, over optical fiber, hybrid fiber coaxial cable network, satellite signals, terrestrial signals, wireless, etc. The communications network may also include a cable modem, an integrated services digital network modem, a digital subscriber line modem, etc., that enables the HMN 1 to communicate to the content provider over the communications network.

Figure 2:
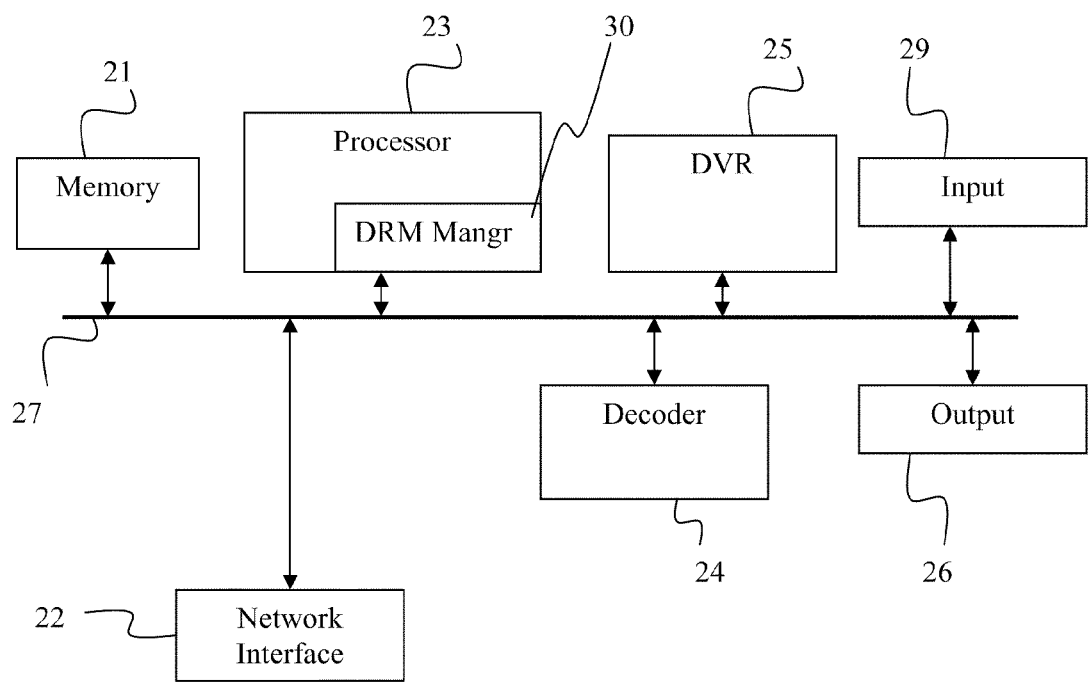
FIG. 2 illustrates an exemplary STB architecture in accordance with the principles of the invention.

FIG. 2 illustrates an exemplary STB arrangement in accordance with the principles of the invention. As shown in FIG. 2, the STB 2 may include a network interface 22 which includes a home network data interface, such as Ethernet, and an optional receiver unit (not shown) which may receive QAM data, such as audio and video (A/V) content from a network through network interface 22. A decoder 24 may decode the received content to be provided to a display through output 26. STB 2 may also include a user input 29, such as an infrared input to receive commands from a user. The STB may include a processor 23 for controlling the operation of the STB. The STB may include a DVR 25 for storing content. The STB may include a DVR 25 and may include a disk for storing content.

The STB may be configured to receive the content in an encrypted form and in an encoding standard, which may be received from a content provider. The encrypted content may comprise media content, such as, network television programs, pay-per-view movies, pay-per-view events, video on demand, video file downloads, audio files, etc., from the content provider through the communications network. The encrypted content is protected using a DRM system. More particularly, the processor 23 preferably includes a DRM manager 30 configured to provide DRM protection for the content. For example, the DRM manager 30 may comprise a copy control information (CCI) manager configured to enforce content rights for the encrypted content. This may include determining content rights for the encrypted content from a rights data file, and then performing an action on the content in compliance with the rights. For example, the DRM manager 30 may determine whether the content rights include a right to transfer before transferring the content to another device. Each rights data file may include content rights, cryptographic key parameters, such as encryption/decryption methods, key types, key seeds, and a content ID. The content ID is a unique identifier of the content. Examples of the content rights include right to copy the content, right to transcode the content, right to play the content, right to move or transfer the content to a third party device, use on certain classed of devices, etc.

The DVR functionality and optional data storage 25 may include a hard drive or other non-volatile data storage storing video and/or other data. The memory 21 may include RAM. The optional memory in 25 and memory 21 are examples of computer readable storage devices that may store computer code executed by the processor 23 to perform various functions described herein. The encrypted content may be stored in the data storage 25. This may include programs from a MPEG stream.

In one example, the processor 23 may include a DRM manager module 30 which implements a DRM system. DRM systems are known in the art and typically include software that imposes limitations on usage of the content determined, which may be set by the content provider, such as copying or content transfer limitations or other content limitations. The STB 2 thus contains hardware and/or software configured to decrypt the encrypted content for playback and/or storage on the memory in DVR function 25. For example, the encrypted content may be protected by a DRM system in the service provider's head-end and delivered to the STB 2 in that encryption format. Thereafter, the STB 2 may perform all DRM operations without accessing an external license server. In a conventional DRM system, a device may be required to get approval or a license from an external license server each time a new class of action, such as a new copy or a transfer to a new device, is needed. According to an embodiment, the content rights for a broad class of DRM actions may be retrieved one time and stored in the STB so a connection to an external license server is not continually required. According to another embodiment, the DVR function may process rules embedded in the received content flow, and originate DRM protection of the video and rules. (examples: IPRM and HMA protection). The STB 2 may issue the access rights for content to other devices in the home network without be approved to an external license server.

Figure 3:
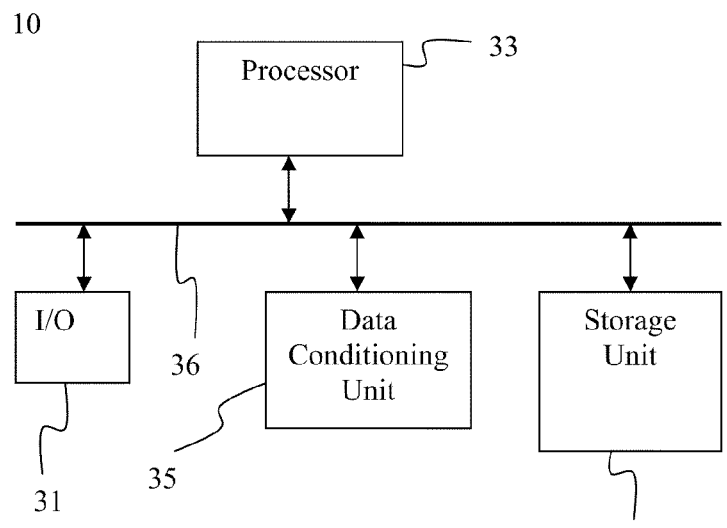
FIG. 3 illustrates an exemplary NAS architecture in accordance with the principles of the invention.

FIG. 3 illustrates an exemplary architecture for a NAS unit 10. As shown, an exemplary NAS 10 preferably contains an input/output port for connection to the network for connection to the other devices on the HMN 1. Those of skill in the art will appreciate that NAS 10 may be connected to a number of STBs or PCs service within the HMN. NAS 10 preferably contains a processor 33 which controls the operation, such as access to NAS 10, connected on a bus 36. A storage unit 37, such as a hard disc drive or other types of non-volatile recording devices capable of recording A/V content. A data conditioning unit 35 may also be included which conditions or modifies transport packages for content received from the network to a suitable transport protocol for transport to a client device to be compatible with requirements of the client device, such as HTTP and/or DLNA. In one implementation, NAS 10 may receive content with a first transport protocol, such as HMA by Motorola, and provide content to clients with a second transport protocol, different from the first. The client may provide instructions identifying a preferred transport protocol, or a preferred protocol may be determined by NAS 10 based on information received from the client.

In a preferred implementation, NAS 10 receives content which was encrypted by a host device with a DVR function (e.g. STB 2) and records the content in encrypted form. The STB 2, or IP STB 6, or PC 12 all may provide content to NAS 10, and serve as a host device for providing content. The NAS preferably does not decrypt the received content, but stores the content in its received encrypted form. In doing so, the NAS 10 is not required to perform security protocols and the content remains secure by use of the encryption of the host (e.g. STB 2). The content also remains bound to the host while stored on NAS 10 such that the content remains under the protection of the DRM protocols of the host. The host (e.g. STB 2) preferably generates a unique key for the host which may be used as a common encryption key for all content, or another individual key may be generated for each piece of content a unique key for each piece of content. The latter may enable less robust clients like the PC to access content. In either case, the content is stored on the NAS 10 in the form in which it was encrypted by the host, e.g. STB 2. Note that clients that require DTCP-IP link security bring an additional complexity factor in, as the NAS must re-encrypt under the DTCP-IP protocol after decryption of the underlying content.

Figure 4:
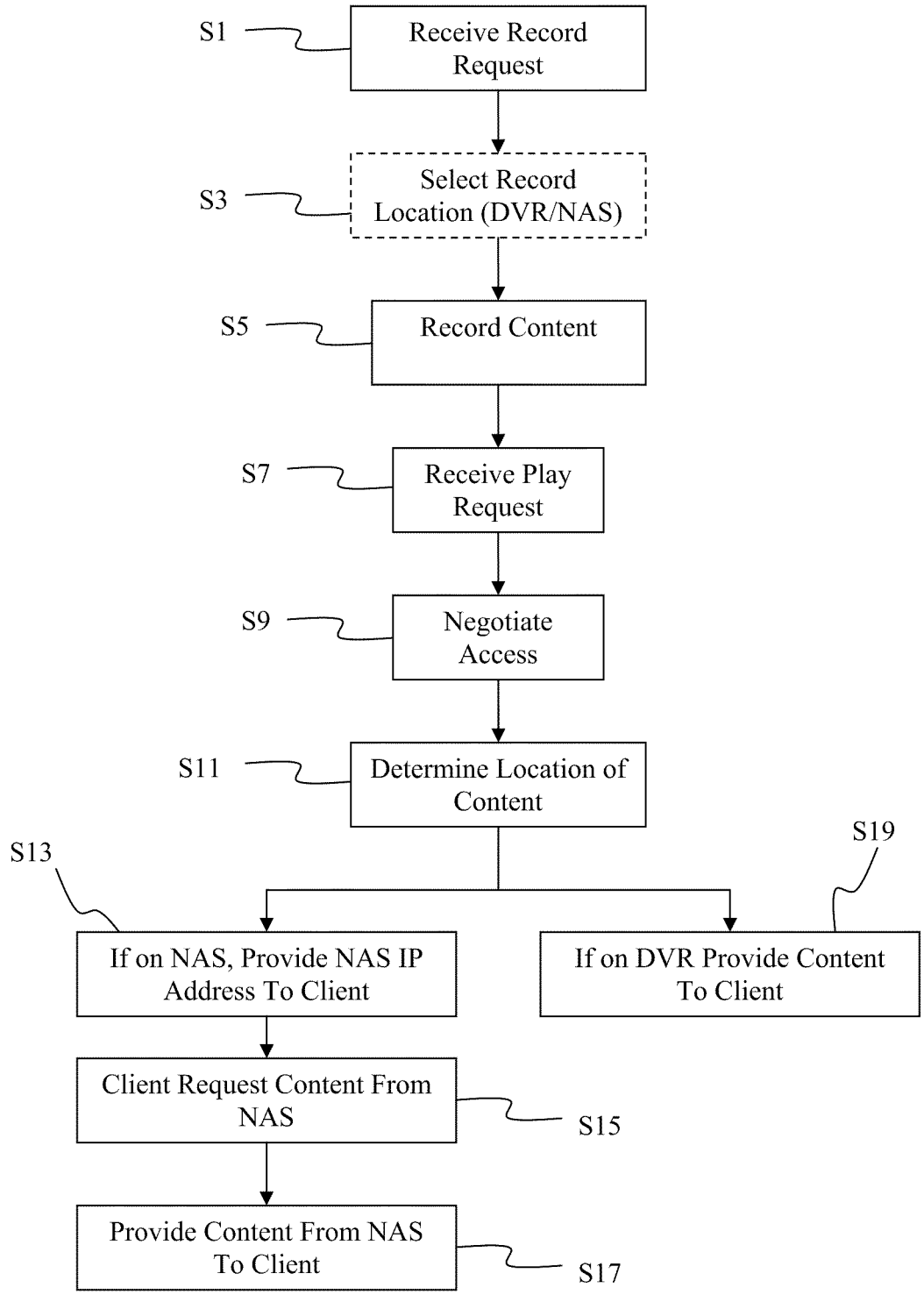
FIG. 4 illustrates an exemplary process flow in accordance with the principles of the invention.

FIG. 4 illustrates an exemplary process in accordance with the principles of the invention. As illustrated, a DVR host, such as STB 2, receives a request to record content from a user, step S1. The STB may optionally determine if the content should be recorded on the local disk of DVR 25 or on NAS 10 and record the content in step S5. In one implementation, the host may first record all content on its local DVR 25, and move the content to NAS 10. Such move may be performed by a user instruction or may be automatically performed based on a number of factors, such as remaining capacity of the storage space of local DVR 25 (e.g. 85% full may trigger a move), age of content on the local DVR, frequency of accessing the content (e.g. content which is accessed less frequently may trigger a move). The move may be performed during an inactive period of the STB, such as when other processing or content delivery is being performed. In any case, the host preferably may maintain a database of the content which is moved and display the listing of the content to a user as if it were located on the local DVR. In a preferred implementation, the storage location of the content may not be easily perceptible to the user. Content movement to the NAS will consume network resources during the transfer, so stream management may be desired in some implementations so as not to interfere with actual home network streaming, which should have priority. In a preferred implementation the transport of content to and from NAS 10 is done in a manner which promotes efficient use of the home network, that is, there is no duplicate bandwidth usage for any video flow.

When a play request is received from a client, step S7, the host and client negotiate access to the content according to a predetermined set of rules and DRM rights, such as the HMA key management dialog in step S9. In step S11 the STB determines the location of the content, and if the content is locally stored on the local DVR disk, provides the content to the client from the DVR in step S19. If the content is stored on NAS 10, the STB provides instructions to the client to access the NAS 10, such as providing an IP address for NAS 10 along with DRM and authentication messages, step S13. As shown in step S15, the client requests the content from NAS 10 and NAS 10 provides the content to the client, step S17. When any client in the home network desires to access content stored on the NAS 10 from the host, it completes the DRM (e.g. HMA or IPRM) key management dialog with host, but then is directed to the NAS, such as being directed to the IP address of the NAS for the content. The NAS preferably understands the transport protocol and flow control of the home network, but it would not have to implement any security or robustness. That is, the invention may provide access to content stored on the NAS 10 by a host device to a client device without the NAS 10 managing DRM rights, while preserving the DRM rights via the host device.

Figure 5:
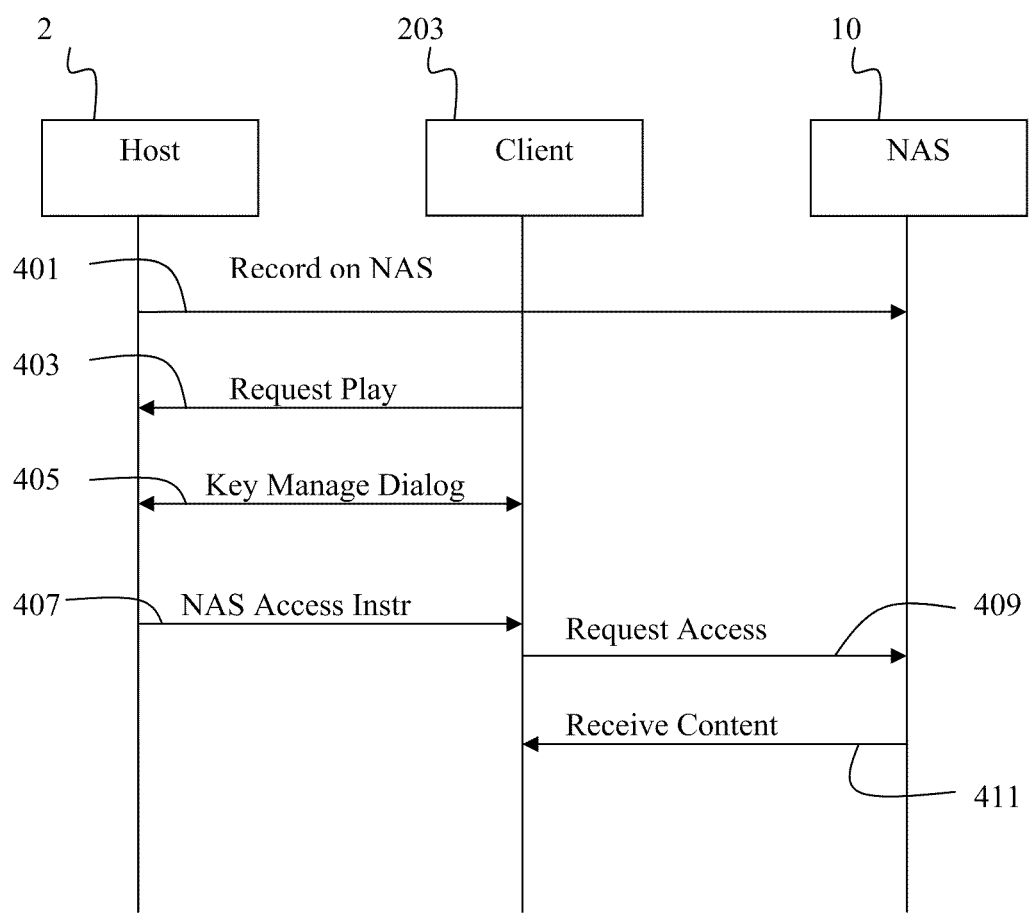
FIG. 5 illustrates an exemplary signal exchange flow in accordance with the principles of the invention.

FIG. 5 illustrates an exemplary signal flow between a host, client 203, and NAS 10. As shown, STB DVR function encrypts the content for storage, and forwards or moves the selected content on NAS 10 in message 401, which illustrates the message to record. Client requests to access or play the content in message 403. The STB and client negotiate access, such as through a DRM key management dialog in messages 405. Once access is negotiated, the STB provides access instructions to the client in message 407. The client requests access to the content stored on NAS 10 in message 409. The content is provided to the client in message 411.

In the preferred implementation each STB/DVR continues to manage the content it recorded or moved to the NAS as its own recorded bound content. In this manner the STB/DVR may move stored video content to the NAS 10 as needed, but retain the DRM content rights data internal to the STB/DVR. The content rights may include management of access rights to record, distribute and playback content.

In one implementation, the NAS may store PC data as well as A/V DVR content. In this implementation, two different types of networks may be required. For example, PC's often expect home networks with DHCP support, while the DVRs may expect the network to have static IP addresses, assigned by default or by the HMA protocol. PC data may be accommodated by using conditioning unit 35 to modify protocols received, such as the HMA protocol, or having the consumer check that the DHCP assigned addresses does not conflict with current DVR IP address usage.

Some or all of the operations set forth in FIGS. 2-5 may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A computer-implemented method comprising:
receiving, by a requesting set-top box of an in-home network that includes at least the requesting set-top box, a host set-top box, and a network attached storage, a first request to access content;
in response to receiving the request to access the content, transmitting, by the requesting set-top box, a second request to access the content to the host set-top box;
in response to transmitting the second request to access the content, negotiating access, by the requesting set-top box, to the content which (i) is not stored by the host set-top box, and (ii) is stored in encrypted form on the network attached storage that is managed by the host set-top box, with the host set-top box, according to a predetermined set of digital rights management rules, wherein access is negotiated between the requesting set-top box and the host set-top box that does not store the content without interacting with an external license server that is outside of the in-home network;
after negotiating the access to the content, receiving, by the requesting set-top box, the encrypted content from the network attached storage; and
accessing the content by the requesting set-top box according to the predetermined set of digital rights management rules negotiated between the requesting set-top box and the host set-top box.

2. The computer-implemented method of claim 1, further comprising maintaining, by the host set-top box, a database of the content that is stored on the network attached storage.

3. The computer-implemented method of claim 1, wherein the predetermined set of digital rights management rules includes a home media architecture (HMA) protocol.

4. The computer-implemented method of claim 1, wherein the predetermined set of digital rights management rules include an intellectual property rights management protocol.

5. The computer-implemented method of claim 1, wherein accessing the content by the requesting set-top box further comprises receiving an internet protocol address associated with the network attached storage.

6. The computer-implemented method of claim 1, further comprising:
before receiving, by the requesting set-top box, the request to access content:
obtaining, by the host set-top box, a set of digital rights management rules;
storing, by the host set-top box, the set of digital rights management rules; and
wherein negotiating access, by the requesting set-top box, to the content which is stored in encrypted form on the network attached storage, with the host set-top box, according to a predetermined set of digital rights management rules, comprises negotiating access, by the requesting set-top box, to the content which is stored in encrypted form on the network attached storage, with the host set-top box, according to the set of digital rights management rules stored by the host set-top box.

7. The method of claim 1, wherein the method further comprises:
receiving, by the requesting set-top box, instructions from the host set-top box for accessing the content that is stored in encrypted form on the network attached storage; transmitting, by the requesting set-top box, a third request to the network attached storage for access to encrypted content;
receiving, by the requesting set-top box, the encrypted content from the network attached storage in response to the third request; and
decrypting, by the requesting set-top box, the encrypted content.

8. The method of claim 7, wherein the instructions further comprise:
instructions for accessing the content that is stored in encrypted form on the network attached storage without any further interaction between the requesting set-top box and the host set-top box.

9. A system comprising:
one or more computers and one or more storage devices storing instructions that are operable, when executed by the one or more computers, to cause the one or more computers to perform operations comprising:
receiving, by a requesting set-top box of an in-home network that includes at least the requesting set-top box, a host set-top box, and a network attached storage, a first request to access content;
in response to receiving the request to access the content, transmitting, by the requesting set-top box, a second request to access the content to the host set-top box;
in response to transmitting the second request to access the content, negotiating access, by the requesting set-top box, to the content which (i) is not stored by the host set-top box, and (ii) is stored in encrypted form on the network attached storage that is managed by the host set-top box, with the host set-top box, according to a predetermined set of digital rights management rules, wherein access is negotiated between the requesting set-top box and the host set-top box that does not store the content without interacting with an external license server that is outside of the in-home network;

after negotiating the access to the content, receiving, by the requesting set-top box, the encrypted content from the network attached storage; and accessing the content by the requesting set-top box according to the predetermined set of digital rights management rules negotiated between the requesting set-top box and the host set-top box.

10. The system of claim 9, the operations further comprising maintaining, by the host set-top box, a database of the content that is stored on the network attached storage.

11. The system of claim 9, wherein the predetermined set of digital rights management rules includes a home media architecture (HMA) protocol.

12. The system of claim 9, wherein the predetermined set of digital rights management rules include an intellectual property rights management protocol.

13. The system of claim 9, wherein accessing the content by the requesting set-top box further comprises receiving an internet protocol address associated with the network attached storage.

14. The system of claim 9, the operations further comprising:

before receiving, by the requesting set-top box, the request to access content:

receiving, by the host set-top box, content in encrypted form;

performing, by the host set-top box, a content transfer process in which the host set-top box (i) relinquishes the content to the network attached storage, and (ii) retains a set of digital rights management rules determined for the content; and wherein negotiating access, by the requesting set-top box, to the content which is stored in encrypted form on the network attached storage, with the host set-top box, according to a predetermined set of digital rights management rules, comprises negotiating access, by the requesting set-top box, to the content which is stored in encrypted form on the network attached storage, with the host set-top box, according to the set of digital rights management rules stored by the host set-top box.

15. A non-transitory computer-readable medium storing software comprising instructions executable by one or more computers which, upon such execution, cause the one or more computers to perform operations comprising:

receiving, by a requesting set-top box of an in-home network that includes at least the requesting set-top box, a host set-top box, and a network attached storage, a first request to access content;

in response to receiving the request to access the content, transmitting, by the requesting set-top box, a second request to access the content to the host set-top box;

in response to transmitting the second request to access the content, negotiating access, by the requesting set-top box, to the content which (i) is not stored by the host set-top box, and (ii) is stored in encrypted form on the network attached storage that is managed by the host set-top box, with the host set-top box, according to a predetermined set of digital rights management rules, wherein access is negotiated between the requesting set-top box and the host set-top box that does not store the content without interacting with an external license server that is outside of the in-home network;

after negotiating the access to the content, receiving, by the requesting set-top box, the encrypted content from the network attached storage; and accessing the content by the requesting set-top box according to the predetermined set of digital rights management rules negotiated between the requesting set-top box and the host set-top box.

16. The computer-readable medium of claim 15, the operations further comprising maintaining, by the host set-top box, a database of the content that is stored on the network attached storage.

17. The computer-readable medium of claim 15, wherein the predetermined set of digital rights management rules includes a home media architecture (HMA) protocol.

18. The computer-readable medium of claim 15, wherein the predetermined set of digital rights management rules include an intellectual property rights management protocol.

19. The computer-readable medium of claim 15, the operations further comprising after negotiating the access to the content, receiving, by the requesting set-top box and from the host set-top box, access instructions to receive the encrypted content from the network attached storage.

20. The computer-readable medium of claim 15, wherein accessing the content by the requesting set-top box further comprises receiving an internet protocol address associated with the network attached storage.

* * * * *